Feb. 19, 1963    S. STANKIEWICZ    3,078,111
TIE ROD ADJUSTER
Filed Sept. 12, 1961
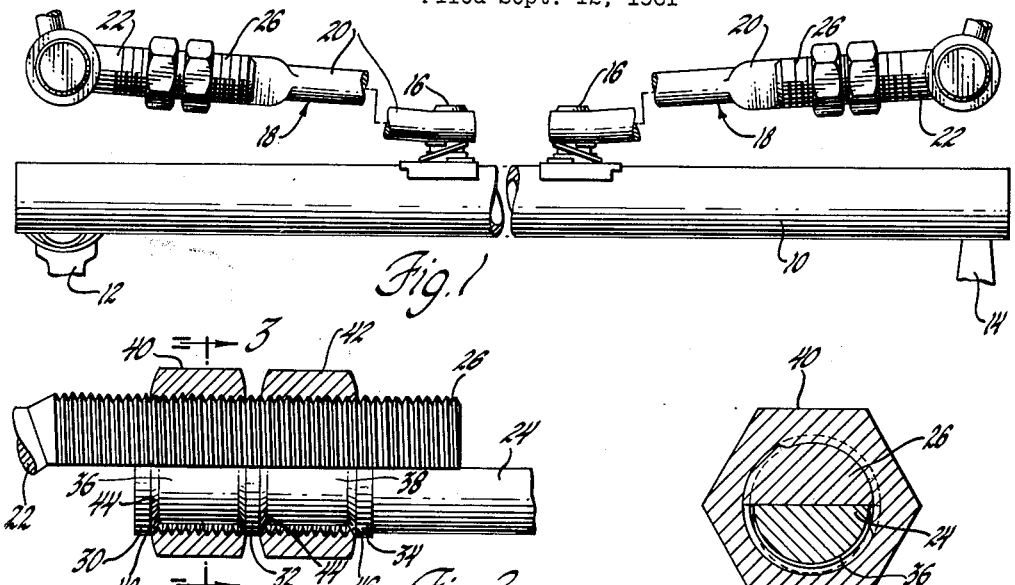
Fig. 1
Fig. 2
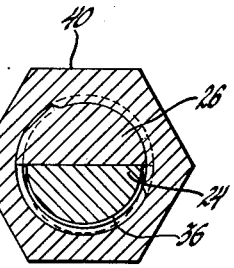
Fig. 3
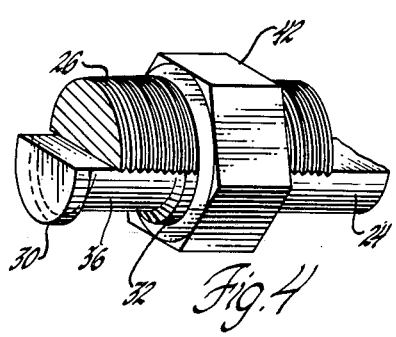
Fig. 4
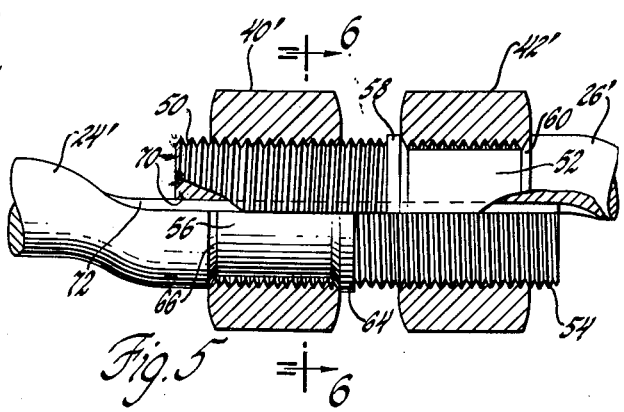
Fig. 5
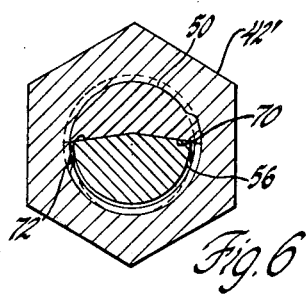
Fig. 6
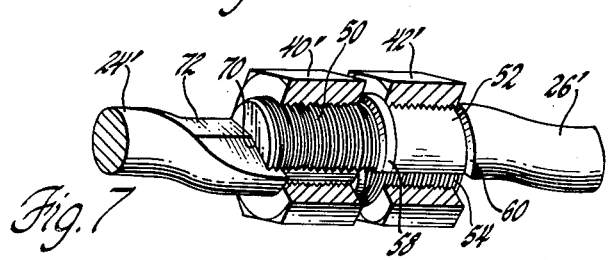
Fig. 7
INVENTOR.
Stanley Stankiewicz
BY
Bryce Beecher
ATTORNEY United States Patent Office 3,078,111
Patented Feb. 19, 1963

3,078,111
TIE ROD ADJUSTER
Stanley Stankiewicz, Saginaw, Mich., assignor to General Motors Corporation, Detroit, Mich., a corporation of Delaware
Filed Sept. 12, 1961, Ser. No. 137,599
7 Claims. (Cl. 287—62)

This invention relates to steering linkages and more particularly concerns a tie rod construction incorporating improved means for lengthening or shortening the rod.

Whatever the design of the steering linkage, it must allow for adjustment in its length so that the steering wheels can be brought into proper alignment. In the case of the conventional truck steer, for example, where the linkage comprises a drag link extending longitudinally of the vehicle and a cross tie rod interconnecting the steering arms at the wheels the cross tie rod is the adjustable member of the linkage. In passenger cars, the steering linkage is usually of the so-called parallelogram type comprising a relay rod extending transversely of the vehicle and interconnecting at either end with a relatively short tie rod. These tie rods actuate the steering knuckle arms and both are made adjustable so that they may be shortened or lengthened as required.

Heretofore the adjustments has been provided for by making the tie rod in two parts connected together by means of a tubular member in which the two parts are threaded, the threaded connections being made secure by clamps encircling the tubular member which is longitudinally split in the area of the clamps.

The present invention has as its principal object to dispense with the tubular member and the clamps to the end of facilitating joining of the tie rod parts and at the same time attaining a cost advantage.

Other objects of the invention will be apparent from the following description and the accompanying drawings which show preferred embodiments of the invention.

In the drawings:

FIGURE 1 is a broken plan view of a steering linkage incorporating the invention;

FIGURE 2 is an enlarged elevation, partly in section, showing the adjustable tie rod connection employed in the embodiment of FIGURE 1;

FIGURE 3 is a section on the line 3—3 in FIGURE 2;

FIGURE 4 is a perspective view illustrating the configuration of flanges carried by one of the tie rod parts;

FIGURE 5 shows a modified construction;

FIGURE 6 is a section on the line 6—6 in FIGURE 5; and

FIGURE 7 is a perspective view, partly in section, addressed to the modified design.

Referring first to FIGURE 1, the numeral 10 denotes the relay rod component of a typical parallelogram steer. This rod is supported at one end by a pitman 12 and at the other end by an idler arm 14. The linkage is actuated by the pitman 12 which should be considered as attached to the output shaft of the steering gear. Idler arm 12 is designed for support by the frame of the vehicle.

Rod 10 has connection through ball pivots 16 with tie rods 18 each of which is formed in two sections 20 and 22. Each section 20 and 22 terminates in a half rod portion 24 and 26, respectively, these portions facing upon one another (FIGURES 2-4). The half rod portion 26 is threaded while the half rod portion 24 carries a plurality of flanges 30, 32 and 34 forming grooves 36 and 38 for the accommodation of nuts 40 and 42, each of which threadingly engages the half rod portion 26.

The inner walls of the flanges 30 and 34 and both walls of the flange 32 are beveled (44) in a manner complementary to the bevels 46 located about the inner diameters of the nuts 40 and 42 at the ends thereof.

To make the connection between the two tie rod sections, nut 42 is slipped over flanges 30 and 32 into the groove 38 between the flanges 32 and 34. Following this, nut 40 is slipped over flange 30 into the groove 36 whereafter the flat of the half rod portion 26 is placed on the flat of the half rod portion 24 and the nuts turned together (clockwise, assuming a right hand thread) to draw the tie rod section 22 toward the tie rod section 20 the required extent. As the final operation, the nuts 40 and 42 are turned in the opposite direction so that the flange bevels 44 located in the direction of their consequent movement become wedgingly engaged by the indicated nut bevels. The force induced by the wedging acts as to radially expand the nuts, thus effectively clamping the two sections of the tie rods together and locking the threads of the nuts and the half rod portion 26.

It is important to observe that the flanges 30 and 32 as viewed in end elevation are formed generally as a fractional moon (FIGS. 3 and 4) thereby to permit of the nuts being slipped over the flanges as described above. The radius of the half rod portion 24 at the grooves 36 and 38 is less than the root radius of the thread on half rod portion 26. With the flanges 30 and 32 formed as illustrated, a portion of each of these flanges extends, as obviously required, radially beyond the major diameter of the nut threads.

Reference will now be made to FIGURES 5-7 illustrating a modification and wherein parts similar to parts shown in FIGURES 1-4 are identified with the same numerals, these numerals, however, being primed. Here each half rod portion 24', 26' is both threaded and grooved, the thread (50, 54) in each instance being located at the rod end. Thread 50 in the particular embodiment is a left hand thread, thread 54 is a right hand thread. Groove 52 on half rod portion 26' is delineated by a flange 58 and a shoulder 60. This shoulder and the inner wall of the flange 58 are beveled for the same purpose as the flanges in the embodiment first described herein.

Groove 56 in half rod portion 24' is formed just as the groove 52 by a beveled flange 64 and a beveled shoulder 66.

The modified design further differs (FIGS. 6 and 7) in that the mating faces 70 and 72 of the half rod portions are fabricated to provide a triangular key and keyway of high angle. Thus the half rod portions are self-piloting and the making of the joint facilitated.

To join the two tie rod sections, the half rod portions 24' and 26' are faced upon one another, as previously described, whereafter the nuts 40' and 42' are turned together, as necessary to draw the two rod sections together to the required extent. Thereafter the nuts are turned in opposite directions to bring about the wedging engagement of the chamfers and locking of the threads.

On the foregoing it should be apparent that there has been provided a tie rod which dispenses entirely with the need for a third part such as is required in the conventional tie rod construction. Moreover, the joint herein does not demand the use of clamps or any similar device, the nuts being self-locking.

What is claimed is:
1. In a steering linkage, a rod component having two sections with complementary, axially extending end portions faced upon one another, one of said sections being threaded, the other having a groove therein at least one wall of which is chamfered, and a threaded nut engag- ing with the threads of said one section and accommodated in part in said groove, at least one end of said nut being chamfered about its inner diameter, such chamfer being wedged against the chamfer of said wall to achieve a thread-locking action.

2. In a steering linkage, a rod component having two sections with complementary, axially extending end portions faced upon one another, one of said portions being threaded, the other carrying a pair of axially spaced flanges having chamfered inner walls, and a threaded nut engaging with the threads of said one portion and accommodated in part between said flanges, the ends of said nut being chamfered about their inner diameters, one of such chamfers being wedged against the chamfer of one of said flanges to achieve a thread-locking action.

3. A rod component as defined by claim 2 which is further distinguished in that the outermost of said flanges is formed to permit of said nut being slipped thereover.

4. In a steering linkage, a link having two sections terminating in half rod portions faced upon one another, one of said portions being threaded, the other comprising axially spaced flanges having chamfered inner walls and delineating a pair of grooves, and a nut accommodated in each said groove and threadingly engaging said one portion, the ends of said nuts being chamfered about their inner diameters, said link being further distinguished in that corresponding chamfers of said nuts are wedged against the chamfers of said grooves complementary thereto to achieve a thread-locking action.

5. A link as defined by claim 4 which is further distinguished in that such of the flanges as need be are formed to permit of said nuts being slipped thereover.

6. In a steering linkage, a link having two sections terminating in half rod portions faced upon one another, each of said portions being threaded at the end thereof and having a groove with chamfered inner walls inward of such threads, the threads of said portions being of opposite hand, and a nut accommodated in the groove of each said portion and threadingly engaging the threads of the other of said portions, the ends of said nuts being chamfered about their inner diameters, said link being further distinguished in that opposed chamfers of said nuts are wedged against the chamfers of said grooves complementary thereto to achieve a thread-locking action.

7. A link as defined by claim 6 which is further distinguished in that the mating faces of said half rod portions are designed to prevent relative slippage of said sections in a plane normal to the axes thereof.

References Cited in the file of this patent
UNITED STATES PATENTS

| | | |
|---|---|---|
| 535,314 | Bartlett et al. | Mar. 5, 1895 |
| 904,522 | Firmin | Nov. 24, 1908 |
| 2,299,526 | Claud-Mantle | Oct. 20, 1942 |